United States Patent [19]

Yokota

[11] Patent Number: 5,088,075
[45] Date of Patent: Feb. 11, 1992

[54] OPTICAL DISK APPARATUS WITH SHORTENED ACCESS TIME AND ROTATED METHOD

[75] Inventor: Tsuneshi Yokota, Kawasaki, Japan

[73] Assignee: Kabushiki Kaisha Toshiba, Kawasaki, Japan

[21] Appl. No.: 341,393

[22] Filed: Apr. 21, 1989

[30] Foreign Application Priority Data

Apr. 22, 1988 [JP] Japan .................................. 63-99518

[51] Int. Cl.$^5$ .............................................. G11B 7/00
[52] U.S. Cl. .................................. 369/32; 369/44.28; 369/54; 369/33; 360/78.05
[58] Field of Search ................... 369/32, 44.28, 57, 56, 369/43, 33, 121, 47, 44.25, 44.27, 44.29, 44.34, 44.35; 360/77.02, 78.05, 28.04; 250/201.5; 358/342, 709

[56] References Cited

U.S. PATENT DOCUMENTS

| | | | |
|---|---|---|---|
| 4,481,613 | 11/1984 | Yokota . | |
| 4,607,358 | 8/1986 | Maeda et al. | 369/44.28 |
| 4,745,587 | 5/1988 | Maeda et al. | 369/44.28 |
| 4,835,752 | 5/1989 | Nakatsu et al. | 369/32 |
| 4,866,687 | 9/1989 | Kasai et al. | 369/33 |
| 4,901,299 | 2/1990 | Nakatsu | 369/44.28 |
| 4,918,680 | 4/1990 | Miyasaka | 369/44.34 |

OTHER PUBLICATIONS

Ogawa et al., High Speed Access Method of Optical Disk Memory, 1986, Optical Memory Symposium, Dec. 19, 1986.
U.S. Ser. No. 07/357,242 dated May 26, 1989, Yokota.
U.S. Ser. No. 07/343,306 dated Apr. 26, 1989, Yamamuro.

Primary Examiner—Roy N. Envall, Jr.
Assistant Examiner—Thang V. Tran
Attorney, Agent, or Firm—Finnegan, Henderson, Farabow, Garrett, and Dunner

[57] ABSTRACT

An optical disk apparatus includes an optical head for converting light reflected from an optical disk into a photoelectric signal, a linear motor for moving the optical head along a radial line of the optical disk and a position determining circuit for determining the position of a track on the basis of track information contained in the photoelectric signal. The distance between the present track that the optical head faces and a target track to which the optical head is to be moved is updated by moved distance information of the optical head. Reference speed information is read out of a memory addressed by the distance information. The speed of the linear motor is speed controlled in accordance with the reference speed information so that the optical head is moved to the target track.

24 Claims, 5 Drawing Sheets

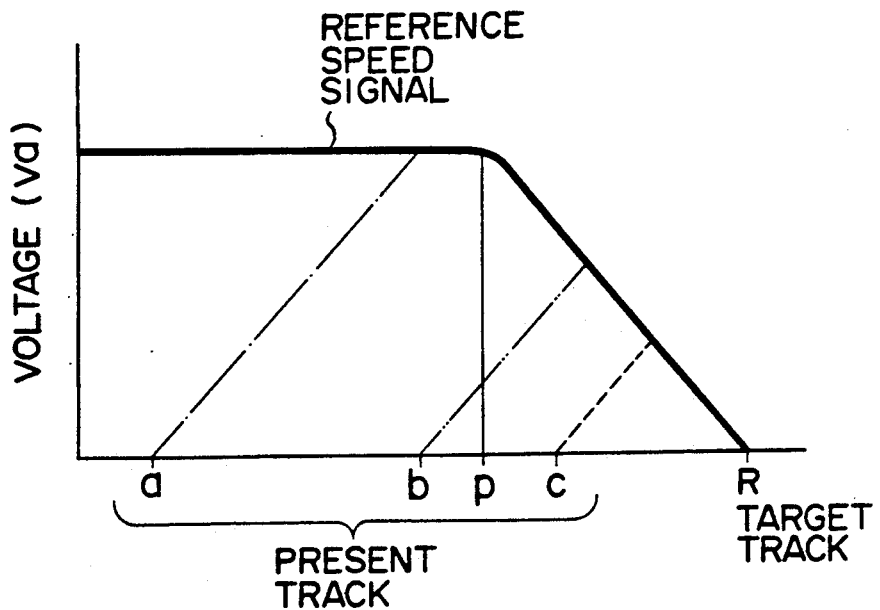
F I G. 5
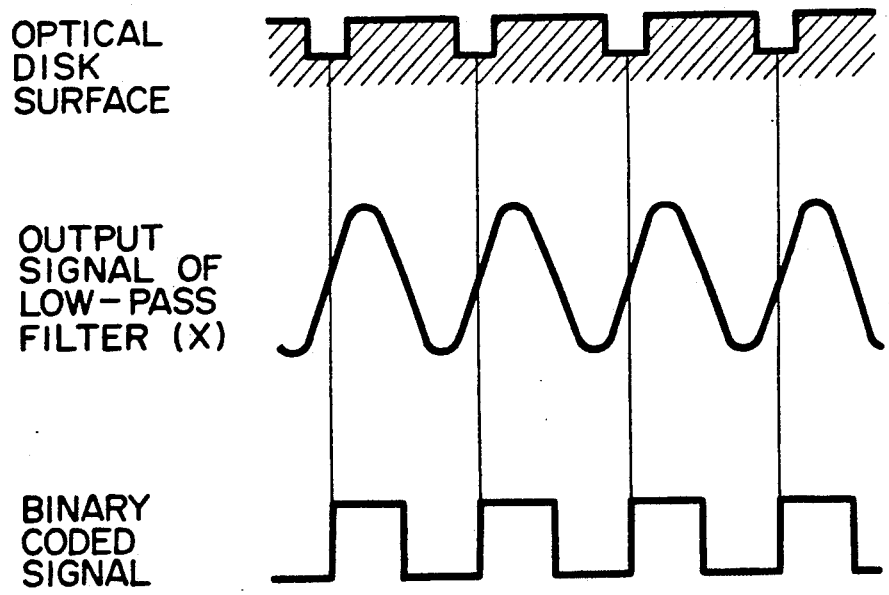
F I G. 6

OPTICAL DISK APPARATUS WITH SHORTENED ACCESS TIME AND ROTATED METHOD

BACKGROUND OF THE INVENTION

1. Field of the Invention

The present invention relates to an optical disk apparatus for recording information on or reproducing information from an optical disk.

2. Description of the Related Art

Various disk apparatus have been developed which record information on an optical disk and reproduce information from the disk with laser beams emitted from a laser, such as a semiconductor laser.

The access mechanism used with a conventional optical device comprises a linear motor for moving an optical head in a radial direction of an optical disk so as to gain coarse access and an objective lens driving mechanism for moving an objective lens installed in the optical head so as to gain fine access. To gain access to a target track using such an access mechanism, the linear motor is first driven for coarse access. By this coarse access the optical head is moved near to the target track. Subsequently track position information is read by the optical head, which represents the position of a track that the optical head faces. A difference between the read track position information and the target track position information is then calculated. If the difference is small, the objective lens is driven for fine access (tracking), whereas if the difference is great, the linear motor is driven again for coarse access.

The above access mechanism, however, has a long access time due to a combination of coarse access and fine access.

SUMMARY OF THE INVENTION

It is an object of the present invention to provide a disk apparatus and method capable of shortening an access time.

According to the present invention, there is provided an optical disk apparatus with shortened access time and rotated method comprising an optical head for directing a light beam onto an optical disk and for converting light reflected from the optical disk to a photoelectric signal; a driving unit for moving the optical head along a radial line of the optical disk; a position determining circuit for determining the position of a present track that the optical head faces based on the photoelectric signal; a calculating circuit for calculating the distance between the present track and a target track; a counter for counting the number of tracks that the light beam from the optical head crosses, based on the photoelectric signal; and a speed control circuit for determining the moving speed of the optical head based on the distance between the present track and the target track and the count obtained by the counter and for controlling the driving unit thereby causing the optical head to reach the target track.

BRIEF DESCRIPTION OF THE DRAWINGS

FIG. 5 is a diagram for explaining the control of moving speed of the optical head in accordance with track positions;

FIG. 6 is a timing chart of signals in FIG. 1; and

DETAILED DESCRIPTION OF THE PREFERRED EMBODIMENTS

Figure 1:
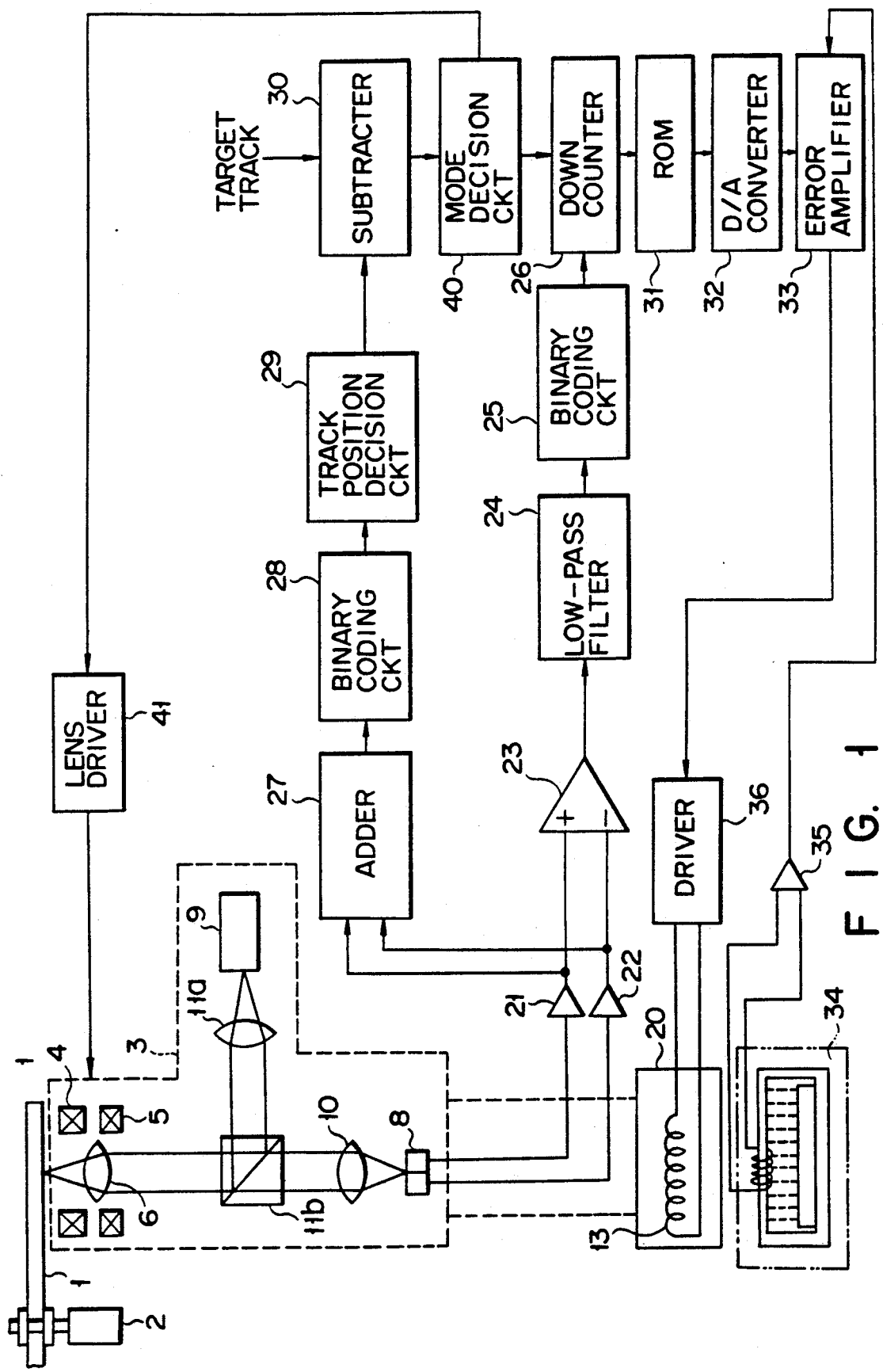
FIG. 1 is a block diagram of a disk apparatus embodying the present invention.
Figure 3:
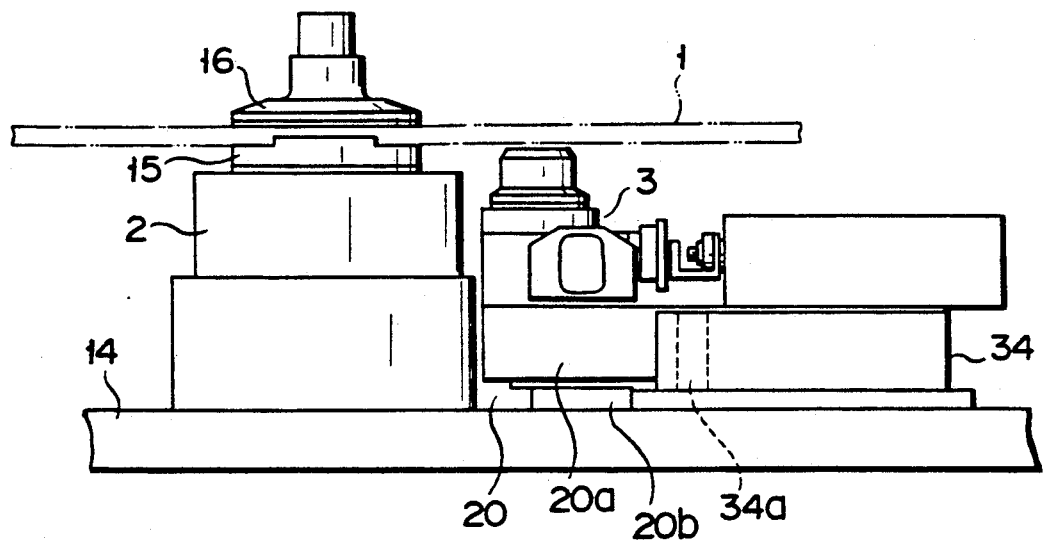
FIG. 3 is a side view of the optical head of FIG. 1.

Referring now to FIG. 1, an optical disk 1 is rotated at a constant speed by a motor 2. More specifically, as shown in FIG. 3, optical disk 1 is held by a clamping member 16 on a turntable 15 coupled to motor 2 attached to a support plate 14. The optical disk rotates together with turntable 15 with the rotation of motor 2.

Moreover, a linear motor 20 is attached to support plate 14 adjacent to motor 2. Linear motor 20 comprises a stator 20b fixed to support plate 14 and an actuator 20a which is driven to move linearly over the stator. Optical head 3 is attached to actuator 20a to face optical disk 1. By application of a driving current to a coil 13 wound around actuator 20a, the actuator 20a is driven to move in the direction of radius of the optical disk 1 with the result that optical head 3 also moves in the direction of radius of the optical disk.

Optical disk 1 has a doughnut-shaped base which is made of glass or plastic and a recording layer 1a deposited on the surface of the base. Recording layer 1a is made of a metal, for example tellurium or bisthmuth.

Figure 2:
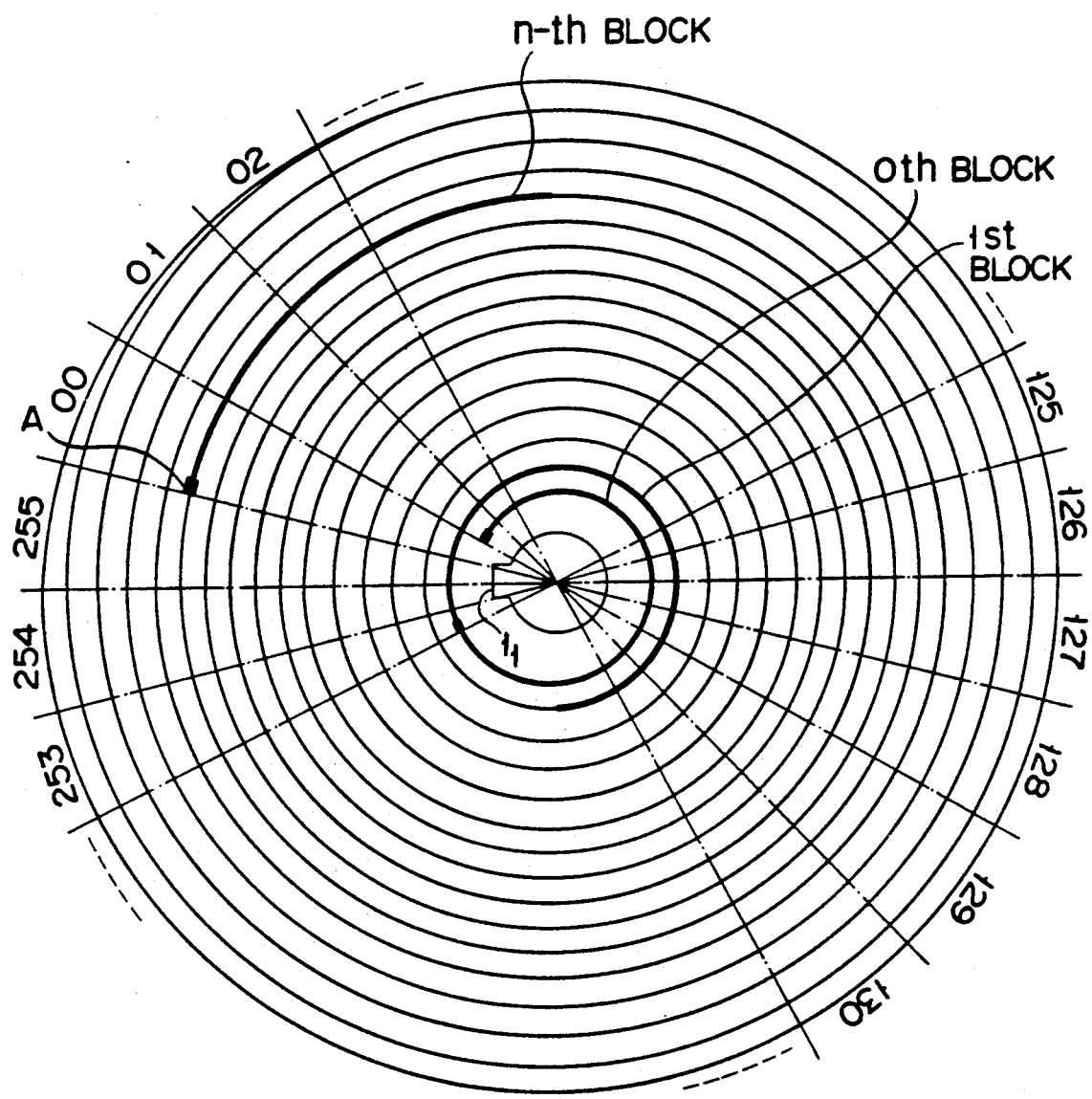
FIG. 2 is, a plan view of an optical disk.

As shown in FIG. 2 a notch serving as a reference position mark 11 is formed near, the center of the metal coating recording layer 1a of optical disk 1. 36000 spiral tracks are formed on the recording surface of optical disk 1, and each of these tracks is divided into 256 sectors of 0 to 255 with the reference position mark taken as "0". The sectors are then grouped into consecutive blocks having substantially the same length.

Optical disk 1 is formatted such that each block starts from a boundary between sectors. When a block does not terminate at a boundary between sectors, a block gap is provided. For example, a block header A including a block number, a track number, and so on is recorded in the start position of each block at the time of manufacture of the disk.

As shown in FIG. 1, optical head 3 has an objective lens 6 which is held by wires or leaf springs (not shown) so as to face optical disk 1. Driving coils 4 and 5 are provided in optical head 3 which surround objective lens 6. Driving coil 4 is adapted to move objective lens 6 in the tracking direction (normal to the direction of the optical axis of objective lens 6), while driving coil 5 is adapted to move objective lens 6 in the focusing direction (the direction of the optical axis of objective lens 6).

Optical head 3 further includes a semiconductor laser 9, a collimating lens 11a and a half mirror 11b. Collimating lens 11a focuses laser light from semiconductor laser 9 into a parallel beam, while mirror 11b directs the parallel beam from the collimating lens 11a in the direction of the optical axis of objective lens 6. The parallel laser beam is focused on the recording surface of optical disk 1 by objective lens 6.

Optical head 3 further includes a condenser lens 10 and a photosensor 8 which are disposed along the optical axis of objective lens 6 and half mirror 11b. Photosensor 8 has a pair of photocells and converts laser beams reflected from optical disk 1, which are received through objective lens 6, half mirror 11b and condenser lens 10, to electric signals.

Output terminals of the photocells of photosensor 8 are connected to an operational amplifier 23 and an adder 27 via amplifiers 21 and 22. Operational amplifier 23 detects the difference between output signals of the photocells and provides an output signal to a low-pass filter 24. Low-pass filter 24 is provided for blocking video signal components contained in the output signal of photosensor 8. In other words, low-pass filter 24 is used to transmit only track detect signals below 500 KHz, for example, each of which is produced when optical head 3 crosses a track of optical disk 1. Low-pass filter 24 is in turn connected to the down count terminal of a down counter 26 via a binary coding circuit 25.

Adder 27 performs addition of several-MHz signals output from the photocells which correspond to header information which is recorded on optical disk 1 and read by optical head 3, for example, a track number. That is, adder 27 detects the track number to provide a track number information signal. The output terminal of adder 27 is connected to a track position decision circuit 29 via a binary coding circuit 28. Track position decision circuit 29 decides the position of a track, or the number of a track, over which optical head 3 is presently positioned, from the track number information signal. The output terminal of track position decision circuit 29 is connected to an input terminal of a subtracter 30. Subtracter 30 subtracts the present track number from a target or desired track number which may be set by a central processing unit ("CPU") (not shown) so as to calculate the difference between both tracks in position.

The output terminal of subtracter 30 is connected to the input terminal of an access mode decision circuit 40. Access mode decision circuit 40 is provided for selecting between an optical head mode in which the target track is accessed by the movement of the optical head and a lens mode in which the target track is accessed by the movement of the objective lens. If the calculated difference between the present track and the target track is small, for example, below 100 tracks at the beginning of the accessing operation, accessing the target track by objective lens 6 would be more effective than accessing by the linear movement of optical head 3. When the track difference is below 100 tracks, therefore, access mode decision circuit 40 sends a signal to a lens driver 41. That is, access mode decision circuit 40 includes a comparator which compares the track number difference obtained from the subtracter with the reference number of tracks, for example, 100 tracks and sets the difference information in down counter 26 or lens driver 41, depending on track difference in number.

Down counter 26 is preset to the difference information by access mode decision circuit 40 and has its output terminal connected to a ROM (read-only memory) 31. ROM 31 stores a speed data table of reference speed data (given in hexadecimal) for counts of down counter 26. That is, when the difference between the present track and the target track is large, such reference speed data as moves the optical head at a high speed is read out of the ROM. As the difference becomes small, reference speed data for low speed movement is read out of the ROM.

The output terminal of ROM 31 is connected to a digital/analog converter ("D/A") 32 for converting digital data from the ROM to an analog signal. The output terminal of D/A converter 32 is connected to an input terminal of an error amplifier 33. An output terminal of a speed detector 34 is connected via an amplifier 35 to the other input terminal of error amplifier 33. Error amplifier 33 produces and amplifies the difference between the reference speed data from ROM 31 and actual speed data detected by speed detector 34 to provide a speed error signal. The output terminal of error amplifier 33 is connected to a linear motor driver 36 which is in turn connected to a driving coil 13. Driving coil 13 is thus supplied with a drive signal corresponding to the speed error signal.

Figure 4:
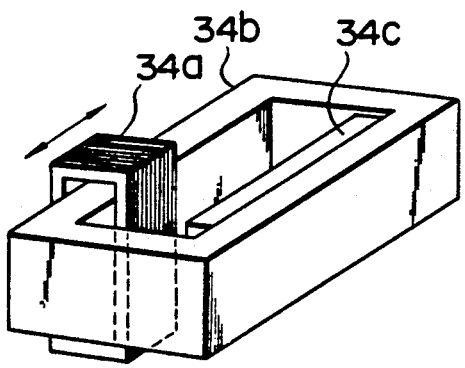
FIG. 4 is a perspective view of the speed detector of FIG. 1.

Speed detector 34, as shown in FIGS. 3 and 4, has a yoke 34b fixed on support plate 14 and fitted with a magnet 34c and a speed detecting coil 34a movably wound around yoke 34b and attached to actuator 20a of linear motor 20. When linear motor 20 is driven, actuator 20a linearly moves along with speed detecting coil 34a, during which time the speed detecting coil 34a cuts magnetic lines of force in yoke 34b. Consequently a voltage d is induced in speed detecting coil 34a which depends on the moving speed and is given by $$d = B \times 1 \times v$$

where B is the magnetic flux in the magnetic circuit formed of yoke 34b, 1 is the effective length of the magnetic circuit and v is the moving speed of linear motor 20. It will thus be understood that speed detector 34 provides a voltage signal depending on the moving speed of linear motor 20 to error amplifier 33 via amplifier 35.

In operation, a power supply (not shown) of the optical disk device is turned on first and a block number to be accessed is then entered into the CPU (not shown) of the device through a keyboard, for example. The CPU reads a track number corresponding to the block number from a self-contained table and sets the target track number in subtracter 30. At this time, motor 2 rotates and semiconductor laser 9 emits laser light. The light reflected from optical disk 1 is directed to photosensor 8 through objective lens 6, half-mirror 11b and condenser lens 10. Photosensor 8 produces output signals corresponding to the incident rays of light thereto, the output signals being applied to operational amplifier 23 after being amplified in amplifiers 21 and 22. Operational amplifier 23 provides a signal indicative of the difference between output signals of the paired photocells of photosensor 8, namely a tracking error detect signal corresponding to a tracking error. The tracking error detect signal is applied to a tracking control circuit for normal tracking control as described subsequently in connection with FIG. 7.

The tracking error signal from operational amplifier 23 is shaped into such a signal (x) as shown in FIG. 6 by low-pass filter 24. The signal (x) exhibits a waveform depending on track grooves on the recording surface 1a of optical disk 1. The output signal (x) of low-pass filter 24 is applied to binary coding circuit 25 for conversion into a binary coded signal (y). The binary coded signal (y) is applied to the down count terminal of down counter 26 which is thus counted down.

On the other hand, adder 27 performs addition of the output signals of photosensor 8 to produce a sum signal which is used as a track information signal containing a track number. The track information signal is binary coded by binary coding circuit 28 and then applied to track position decision circuit 29. Track position decision circuit 29 decides the position of a track that optical head 3 faces at the present moment on the basis of the binary track information signal from binary coding circuit 28 and sends the result of the decision (track number) to subtracter 30.

Subtracter 30 calculates the difference between the preset target track number (target track position) and the present track number (present track position) decided by track position decision circuit 29 and provides the result of subtraction to access mode decision circuit 40. As a result of subtraction, when the number of tracks represented by the difference in track number exceeds 100, access mode decision circuit 38 sets the number of tracks obtained by subtracter 30 in down counter 26. In down counter 26, the number of tracks (corresponding to the distance to be traveled by the optical head) is counted down by the binary coded signal from binary coding circuit 25, namely a pulse generated each time the light beam crosses a track. The count information in down counter 26 is used as address data to ROM 31. ROM 31 is accessed by the address data to provide reference speed data, corresponding to the number of tracks based on the track number difference, to D/A converter 32. The reference speed data is converted by D/A converter 32 into an analog value which in turn is applied to error amplifier 33.

Error amplifier 33 produces a voltage corresponding to the difference between the reference speed signal supplied through D/A converter 32 and the detected speed signal supplied from speed detector 34 through amplifier 35. That is, for the distance from an initial track to the target track the reference speed signal is set to vary as shown by a solid line in FIG. 5. Error amplifier 33 produces a voltage V corresponding to the difference between the reference speed signal and a detected speed signal represented by a dot-dash line (a), a two-dot-dash line (b) or a broken line (c), for example. By the application of the voltage produced by error amplifier 33 through driver 36, linear motor 20 is driven to move.

Assuming that optical head 3 is positioned at track a, for example, at the beginning of operation and the target track is set to track R, the number of tracks, which corresponds to distance R-a, is set in down counter 26. The number of tracks is applied to ROM 31 as address data so that reference speed data is read therefrom. In the present case, the actual position of track a falls within the maximum distance range viewing from the target track R with the result that reference speed data for the maximum speed is read from ROM 31. The reference speed data is entered into error amplifier 33 via D/A converter 32. Accordingly, linear motor 20 is driven by the voltage V corresponding to the maximum reference speed to move with gradually increasing speed as shown by a speed curve corresponding to the track position a denoted by the dot-dash line.

The laser beam emitted by optical head 3 crosses the tracks of optical disk 1 while linear motor 20 travels with the result that pulses which correspond in number to tracks that the laser beam crosses are applied to down counter 26. Down counter 26 is thus counted down so that the address to ROM 31 is updated. However, since ROM 31 stores the same reference speed data up to the address corresponding to the position p, the reference speed data read from ROM 31 remains unchanged even if the address is updated. Linear motor 20 thus travels at the maximum reference speed.

Speed detector 34 detects the traveling speed of linear motor 20 and provides error amplifier 33 via amplifier 35 with a traveling speed signal increasing with the speed of linear motor 20 as shown by the dot-dash line. Error amplifier 33 provides a voltage corresponding to the difference between the traveling speed signal and the reference speed signal. That is, error amplifier 33 provides a voltage corresponding to the difference between the solid line (reference speed) and the dot-dash line (detected speed) of FIG. 5, and linear motor 20 is driven by the voltage through driver 36. When the detected speed signal coincides with the reference speed signal, namely when the actual speed curve intersects the reference speed curve, a voltage on the reference speed curve is output from error amplifier 33. Linear motor 20 is thus driven by the voltage on the reference speed curve to move at the reference speed.

When linear motor 20 is thus driven, optical head 3 travels along a radial line of optical disk 1 so that the laser beam crosses the tracks. Down counter 26 is counted down by the number of tracks that the laser beam has crossed. After down counter 26 has been counted down to a value corresponding to the position p, the contents read from ROM 31 change gradually. That is, the reference speed data gradually decreasing in magnitude is read from ROM 31. In response to application of the decreasing reference speed data to error amplifier 33 via D/A converter 32, linear motor 20 slows down in accordance with the descending curve shown by the solid line in FIG. 5 and finally stops at the position R of the target track.

Where the target track specified by the CPU is R and the present track detected by track position decision circuit 29 is b, "R-b" is set in down counter 26. Consequently reference speed data shown by the solid line in FIG. 5 is read from ROM 31 and then applied to error amplifier 33 via D/A 32. Thus, optical head 3 mounted to linear motor 20 is moved from track position b at gradually increasing speed as shown by the two-dot-dash line in FIG. 5. After the actual speed signal becomes equal to the reference speed signal, optical head 3 and linear motor 20 move at speed based on the speed curve of the reference speed signal.

Where the target track specified by the CPU is R and the present track detected by track position decision circuit 29 is c, "R-c" is set in down counter 26. Consequently reference speed data shown by the solid line in FIG. 5 is read from ROM 31 and then applied to error amplifier 33 via D/A 32. Thus, optical head 3 mounted to linear motor 20 is moved from track position c at gradually increasing speed as shown by the broken line in FIG. 5. After the actual speed signal becomes equal to the reference speed signal, optical head 3 and linear motor 20 move at speed based on the curve of the reference speed signal and stop at the target track.

As described above, the number of tracks between a track that the optical head faces and the target track is detected at the time of movement of the optical head and a drive voltage corresponding to the detected number of tracks is produced. Track accessing is performed such that the difference between the actual speed signal corresponding to the moving speed of the optical head and the reference speed signal becomes zero. In other words, track accessing is controlled by comparison between the reference speed and the moving speed of the optical head. According to the track accessing method, the target track can be reached by the optical head at a faster access time. This makes it possible to attain sure track accessing at high speed.

Since the moving speed of the optical head is controlled in accordance with the difference between the present position at the beginning of track accessing and the target track position, the optical head can be stopped precisely at the target track, and the landing of the laser beam on the target track can be made accurately and rapidly. Moreover, sure high-speed access to a track can be performed owing to the provision of the speed detector.

Figure 7:
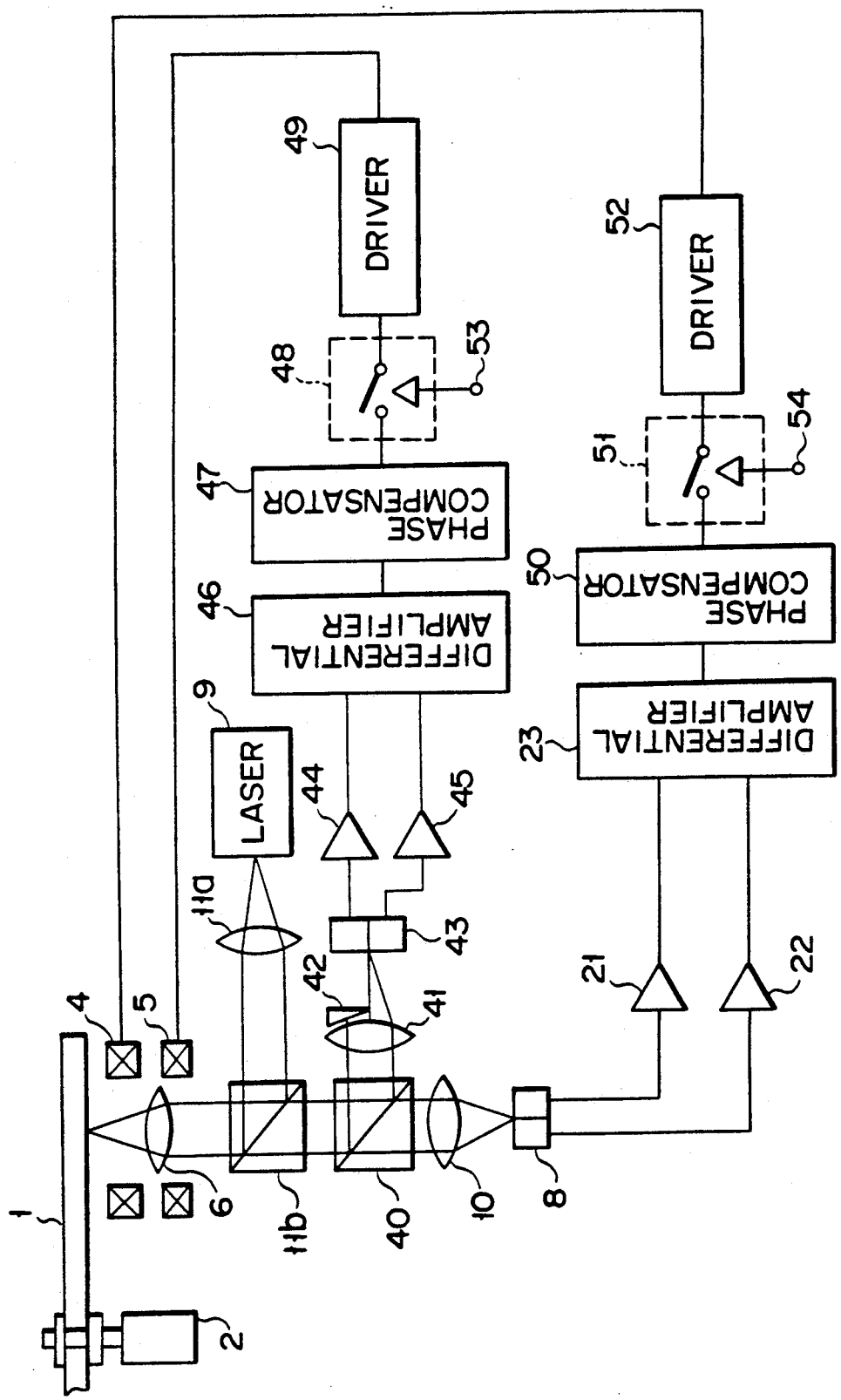
FIG. 7 is a block diagram of a disk device according to another embodiment.

The focus servo circuit and the tracking servo circuit will be described with reference to FIG. 7.

A beam of light reflected from optical disk 1 travels through a half prism 11b and is divided into two beams by a half mirror 40. One of the beams of reflected light travels through a condenser lens 41 and then is cut in half by a knife wedge 42. The beam of reflected light passing through knife wedge 42 falls on a two-piece detector 43. The focus error detection based on the well known knife wedge method is performed utilizing an output signal of detector 43. That is, detector 43 responds to the incident beam of reflected light to provide two electric signals which are amplified by preamplifiers 44 and 45, respectively, for application to a differential amplifier 46. Differential amplifier 46 detects and amplifies the difference between the two electric signals. An output signal of differential amplifier 46, or a focus error signal is applied to an analog switch 48 via a phase compensator 47 adapted for stabilization of focus servo. The focus servo is enabled or disabled by turning analog switch 48 on or off with a control signal 53. When analog switch 48 is on, a driver 49 applies a drive current to actuating coil 5 so as to perform the focus servo.

On the other hand, two electric signals output from two-piece detector 8 are amplified by preamplifiers 21 and 22, respectively, for application to differential amplifier 23. Differential amplifier 23 detects the difference between the two signals from detector 8 to provide a track deviation signal. The track deviation signal is applied to analog switch 51 via phase compensator 50 adapted for servo stabilization. Analog switch 51 is turned on or off by control signal 54 with the result that the tracking servo is enabled or disabled. When analog switch 54 is on, driver 52 applies a drive current to lens actuating coil 4 so that the tracking servo is performed.

At the time of access, to accurately count the number of tracks between the present track and the target track that the optical head crosses, the focussing servo must be performed properly, in which case laser 9 is turned on and analog switch 48 of the focus servo circuit is turned on by control signal 53.

In the above state, at the start of accessing the target track, analog switch 51 is turned off by the tracking control signal and thus the tracking servo is disabled. As a result, the optical head is moved along a radial line of the optical disk so as to gain access to the target track. At this time, a focused spot moves along the radial line of the optical disk as the optical head moves. As a result, track signals can accurately be obtained through differential amplifier 23, lowpass filter 24 and binary coding circuit 25, and the number of tracks to the target track can thus be counted accurately.

Although, in the prior art, coarse access is performed by controlling the movement of the optical head using an external scale, coarse access is unnecessary in the present invention as described above.

According to the present invention, as described above, there is provided an optical disk device which can shorten the access time and can attain sure and fast track accessing.

What is claimed is:

1. An optical disk apparatus for accessing a target track of an optical disk having a plurality of tracks wherein track information is recorded on said optical disk, comprising:
    optical head means for directing a light beam onto said optical disk and for converting light reflected from said optical disk to a photoelectric signal, the optical head means having at least two photocells for providing photoelectric signals;
    driving means coupled to said optical head means for moving said optical head means in a radial direction of said optical disk;
    position determining means coupled to said optical head means for determining a present track that said optical head means faces based on the photoelectric signal, the position determining means including means for extracting the track information from the photoelectric signal, an adder for adding together the photoelectric signals from said photocells to provide a sum signal, and binary coding means for converting the sum signal into a binary coded signal;
    calculating means coupled to said position determining means for calculating the distance between the present track and the target track;
    moved distance detecting means for detecting the moved distance of said optical head means; and
    speed control means for determining a moving speed of said optical head means based on the distance between the present track and the target track and the moved distance and for controlling said driving means, thereby causing said optical head means to access the target track.

2. An optical disk apparatus according to claim 1, wherein
    said photoelectric signal includes track signal components each of which is produced when the light beam crosses a track; and
    said moved distance detecting means comprises filter means for extracting the track signal component from said photoelectric signal; and counting means for counting the track signal components extracted from the photoelectric signal.

3. An optical disk apparatus according to claim 1, wherein said speed control means comprises:
    means for subtracting the moved distance from the distance between the present track and the target track, and
    speed determining means for determining the moving speed of said optical head means based on the result of subtraction and applying speed information to said driving means.

4. An optical disk apparatus according to claim 3, wherein said speed determining means further comprises:
    memory means for storing speed information corresponding to distance between the target track and the present track, said memory means being addressed by the subtraction information to read out the speed information.

5. An optical disk apparatus for accessing a target track of an optical disk having a plurality of tracks, comprising:

optical head means for directing a light beam onto said optical disk and for converting light reflected from said optical disk to a photoelectric signal;

driving means coupled to said optical head means for moving said optical head means along a radial line of said optical disk;

position determining means coupled to said optical head means for determining a present track that said optical head means faces based on the photoelectric signal;

calculating means coupled to said position determining means for calculating the difference between the present track and the target track indicative of the distance from the present track to the target track through which said optical head means is to be moved;

moved distance detecting means for detecting the moved distance of said optical head means and updating the distance between the present track and the target track in accordance with the moved distance;

reference speed providing means coupled to said calculating means and said moved distance detecting means for providing a reference speed corresponding to the distance between the present track and the target track;

moving speed detecting means for detecting the moving speed of said optical head means;

speed determining means coupled to said reference speed providing means and said speed detecting means for determining a desired moving speed of said optical head means based on the reference speed and the moving speed; and speed control means for controlling said driving means in accordance with the desired moving speed thereby causing said optical head means to reach the target track.

6. An optical disk apparatus according to claim 5, wherein
said speed detecting means comprises electromagnetic means arranged to move along with said optical head means for providing a voltage corresponding to the moving speed of said optical head means.

7. An optical disk apparatus according to claim 5, wherein
track information is recorded on said optical disk; and
said position determining means comprises means for extracting the track information from the photoelectric signal.

8. An optical disk apparatus according to claim 7, wherein
said optical head means has at least two photocells for providing photoelectric signals; and
said position determining means further comprises:
an adder for adding together the photoelectric signals from said photocells to provide a sum signal;
binary coding means for converting the sum signal from said adder into a binary coded signal; and
readout means for reading the track information from the binary coded signal from said binary coding means.

9. An optical disk apparatus according to claim 5, wherein
said photoelectric signal includes track signal components each of which is produced when the light beam crosses a track; and
said moved distance detecting means comprises filter means for extracting the track signal component from the photoelectric signal, and counting means for counting the track signal components extracted from the photoelectric signal.

10. An optical disk apparatus according to claim 5, wherein
said moved distance detecting means comprises means for updating the distance between the present track and the target track by subtracting the moved distance from the distance between the present track and the target track.

11. An optical disk apparatus according to claim 7, wherein said reference speed information providing means comprises:
memory means for storing speed information corresponding to the distance between the target track and the present track, said memory means being addressed by said distance information to read out the speed information.

12. An optical disk apparatus for accessing a target track of an optical disk having a plurality of tracks comprising:
optical head means, having an objective lens and a driving member for driving said objective lens, for directing a light beam onto said optical disk and for converting light reflected from said optical disk into a photoelectric signal which includes track signal components, each track signal component being produced when the light beam crosses a track;

driving means coupled to said optical head means for moving said optical head means along a radial direction of said optical disk;

position determining means coupled to said optical head means for determining a present track that said optical head means faces based on the photoelectric signal, the position determining means including means for extracting the track information from the photoelectric signal;

calculating means coupled to said position determining means for calculating the distance between the present track and the target track indicative of the distance between the present track and the target track through which said optical head means is to be moved;

mode decision means for comparing the distance between the present track and the target track with a predetermined reference value to provide a lens mode signal to select a lens mode when said distance is less than the reference value; and driving means responsive to said lens mode signal for driving said objective lens of said optical head means so as to aim the light beam at the target track.

13. An optical disk apparatus for accessing a target track of an optical disk having a plurality of tracks, said apparatus having an operation state and a non-operation state, said apparatus comprising:
optical head means for directing the light beam onto said optical disk, said optical head means including focusing control means for focusing the light beam on said optical disk and tracking control means for causing the laser beam to follow the track on said optical disk;

means for moving said optical head means in a radial direction of said optical disk in said operation state;

means for selecting said tracking control means in said non-operation state and said focusing control means in operation state;

means for counting the tracks crossed by the light beam when said optical head means is moved by said moving means so as to detect a present track position of the light beam;

means for determining the distance between the present track position and the target track;

means for determining a moving speed of said moving means based on the distance between the present track position and the target track; and means for driving said moving means at said moving speed thereby directly accessing the light beam directed by said optical head means on the target track of said optical disk.

14. A method of accessing with an optical head a target track of an optical disk having a plurality of tracks, the track information being recorded on said optical disk, the method comprising:

directing a light beam from said optical head having at least two photocells for providing photoelectric signals onto said optical disk and converting light reflected from said optical disk to a photoelectric signal;

determining a present track that said optical head faces based on the photoelectric signal, including the sub-steps of extracting the track information from the photoelectric signal, adding together the photoelectric signals from said photocells to provide a sum signal, converting the sum signal into a binary coded signal, and reading the track information from the binary coded signal;

calculating the distance between the present track and the target track;

moving said optical head in a radial direction of said optical disk;

detecting the moved distance of said optical head;

determining a moving speed of said optical head based on the distance between the present track and the target track and the moved distance; and controlling a drive motor to move said optical head at said moving speed to access the target track.

15. The method of claim 14, wherein said photoelectric signal includes track signal components each of which is produced when the light beam crosses a track; and said step of detecting the moved distance includes the sub-steps of extracting the track signal components from the photoelectric signal, and counting the track signal components extracted from the photoelectric signal.

16. The method of claim 14, wherein said step of determining the moving speed of said optical head includes the sub-steps of subtracting the moved distance from the distance between the present track and the target track, and determining the moving speed of said optical head based on the result of said subtraction.

17. The method of claim 16, wherein said step of determining the moving speed of said optical head further includes the sub-steps of storing in a memory speed information corresponding to the distance between the target track and the present track, and addressing said memory by said subtraction information to read out the speed information.

18. A method for accessing with an optical head a target track of an optical disk having a plurality of tracks, the method comprising:

directing a light beam from said optical head onto said optical disk and converting light reflected from said optical disk to a photoelectric signal;

determining a present track that said optical head faces based on the photoelectric signal;

calculating the difference between the present track and the target track indicative of the distance from the present track to the target track through which the optical head is to be moved;

moving said optical head in a radial direction of said optical disk;

detecting the moved distance of said optical head and updating the distance between the present track and the target track in accordance with the moved distance;

providing a reference speed corresponding to the distance between the present track and the target track;

detecting the moving speed of said optical head;

determining a desired moving speed of said optical head based on the reference speed and the moving speed; and controlling a drive motor in accordance with the desired moving speed to move said optical head to access the target track.

19. The method of claim 18, wherein track information is recorded on said optical disk; and said step of determining a present track includes the sub-step or extracting the track information from the photoelectric signal.

20. The method of claim 19, wherein said optical head has at least two photocells for providing photoelectric signals; and said position determining step includes the substeps of adding together the photoelectric signals from said photocells to provide a sum signal, converting the sum signal into a binary coded signal, and reading the track information from the binary coded signal.

21. The method of claim 18, wherein said photoelectric signal includes track signal components each of which is produced when the light beam crossed a track; and said step of detecting the moved distance includes the sub-steps of extracting the track signal components from the photoelectric signal, and counting the track signal components extracted from the photoelectric signal.

22. The method of claim 18, wherein said step of detecting the moved distance of said optical head includes the sub-step of updating the distance between the present track and the target track by subtracting the moved distance from the distance between the present track and the target track.

23. The method of claim 18, wherein said step of providing a reference speed includes the sub-steps of storing in a memory speed information corresponding to the distance between the target track and the present track, and addressing said memory by said distance information to read out the speed information.

24. A method of accessing with an optical head a target track of an optical disk having a plurality of tracks, said optical head having an objective leans and a driving member for driving said objective leans, the method comprising:

directing a light beam from said optical head onto said optical disk and converting light reflected from said optical disk to a photoelectric signal, which includes track signal components, each of the track signal components being produced when the light beam crosses a track;

determining a present track that said optical head faces based on the photoelectric signal;

extracting the track information from the photoelectric signal;

calculating the difference between the present track and the target track indicative of the distance from the present track calculating the difference between the present track and the target track indicative of the distance from the present track to the target track through which the optical head is to be moved;

comparing the distance between the present track and the target track with a predetermined reference value; and driving said objective lens when said distance is less than the reference value so as to aim the light beam at the target track.

* * * * *